United States Patent
Sima

(10) Patent No.: US 9,081,963 B1
(45) Date of Patent: Jul. 14, 2015

(54) PROTECTING AGAINST USE OF UNAUTHORIZED ELECTRONIC HARDWARE DEVICES

(75) Inventor: Ronen Sima, Shimshit DN Hamovil (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 738 days.

(21) Appl. No.: 12/715,184

(22) Filed: Mar. 1, 2010

Related U.S. Application Data

(60) Provisional application No. 61/156,151, filed on Feb. 27, 2009, provisional application No. 61/182,988, filed on Jun. 1, 2009.

(51) Int. Cl.
*G06F 21/00* (2013.01)
*G06F 21/57* (2013.01)

(52) U.S. Cl.
CPC ....................... *G06F 21/57* (2013.01)

(58) Field of Classification Search
CPC ..... G06F 2221/21; G06F 21/57; G06F 12/14; G06F 12/1425; G06F 21/70; H04L 9/3234
USPC .......................................................... 713/189
See application file for complete search history.

(56) References Cited

U.S. PATENT DOCUMENTS

| | | | | |
|---|---|---|---|---|
| 4,278,837 A * | 7/1981 | Best | ............................... | 713/190 |
| 6,278,782 B1 * | 8/2001 | Ober et al. | .................... | 380/264 |
| 7,181,620 B1 * | 2/2007 | Hur | ................................ | 713/171 |
| 2003/0061488 A1 * | 3/2003 | Huebler et al. | ............... | 713/176 |
| 2003/0065927 A1 * | 4/2003 | Penner | .......................... | 713/189 |
| 2006/0101288 A1 * | 5/2006 | Smeets et al. | ................. | 713/194 |
| 2008/0159541 A1 * | 7/2008 | Kumar et al. | ................. | 380/278 |
| 2008/0163383 A1 * | 7/2008 | Kumar et al. | ................... | 726/29 |
| 2009/0217054 A1 * | 8/2009 | Haider et al. | ................. | 713/189 |

\* cited by examiner

*Primary Examiner* — Harunur Rashid

(57) ABSTRACT

Some of the embodiments of the present disclosure provide a method comprising acquiring an electrical circuit identifier for an electrical circuit, wherein the electrical circuit identifier is stored in a programmable identifier unit of the electrical circuit; generating, by a computing device external to the electrical circuit, an encrypted identifier that is unique for an electrical device that includes the electrical circuit, wherein the encrypted identifier is based upon the electrical circuit identifier and an encryption block; and storing the encrypted identifier in the programmable identifier unit. Other embodiments are also described and claimed.

17 Claims, 3 Drawing Sheets

… (1) …

PROTECTING AGAINST USE OF UNAUTHORIZED ELECTRONIC HARDWARE DEVICES

CROSS REFERENCE TO RELATED APPLICATIONS

The present application claims priority to U.S. Patent Application No. 61/156,151, filed Feb. 27, 2009, and U.S. Patent Application No. 61/182,988, filed Jun. 1, 2009, the entire specifications of which are hereby incorporated by reference in its entirety for all purposes, except for those sections, if any, that are inconsistent with this specification.

TECHNICAL FIELD

Embodiments of the present disclosure relate to security measures for preventing unauthorized use of hardware devices, and more specifically to methods for providing encrypted keys.

BACKGROUND

Original equipment manufacturers (OEMs) and original device manufacturers (ODMs) invest a great deal of time and resources to develop, encode, verify and certify software and binary code for operation on their various devices. Much of the software and binary code is utilized for embedded systems, which include System-on-a-Chip (SoC) devices.

Accordingly, some OEMs and ODMs have an interest in ensuring that the software and binary code they provide will be operable only on approved hardware devices, for example hardware devices that are obtained from approved vendors, but not on devices obtained from other vendors or similar devices that can also run the software.

Unless otherwise indicated herein, the approaches described in this section are not prior art to the claims in this application and are not admitted to be prior art by inclusion in this section.

SUMMARY

In various embodiments, the present disclosure provides a method comprising acquiring an electrical circuit identifier for an electrical circuit, wherein the electrical circuit identifier is stored in a programmable identifier unit of the electrical circuit; generating, by a computing device external to the electrical circuit, an encrypted identifier that is unique for an electrical device that includes the electrical circuit, wherein the encrypted identifier is based upon the electrical circuit identifier and an encryption block; and storing the encrypted identifier in the programmable identifier unit.

In various embodiments, the present disclosure also provides an apparatus comprising an electrical circuit, where the electrical circuit comprises a programmable identifier unit including an electrical circuit identifier, storage that stores system code, and a processor. The system code is configured to cause the processor upon start up of the apparatus to determine whether a genuine encrypted identifier was previously generated for an electronic device that includes the apparatus. If no genuine encrypted identifier was previously generated for the electronic device, the system code is configured to cause the processor to read the programmable identifier to determine the electrical circuit identifier, communicate with an external computing device receive an encrypted identifier that is unique for the electronic device, the encrypted identifier being generated by the external computing device and wherein the encrypted identifier is based upon the electrical circuit identifier and an encryption block, and store the encrypted identifier in the programmable identifier unit.

In various embodiments, the present disclosure also provides an electronic device comprising a chip that comprises a system-on-a-chip (SoC), where the SoC comprises a programmable identifier unit including an SoC identifier, storage that stores system code and a processor. The system code is configured to cause the processor upon start up of the SoC to determine whether a genuine encrypted identifier was previously generated for the electronic device. If no genuine encrypted identifier was previously generated for the electronic device, the system code is configured to cause the processor to read the programmable identifier to determine the SoC identifier, communicate with an external computing device, receive an encrypted identifier that is unique for the electronic device, the encrypted identifier being generated by the external computing device and wherein the encrypted identifier is based upon the SoC identifier and an encryption block, and store the encrypted identifier in the programmable identifier unit.

BRIEF DESCRIPTION OF THE DRAWINGS

In the following detailed description, reference is made to the accompanying drawings which form a part hereof wherein like numerals designate like parts throughout, and in which is shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

DETAILED DESCRIPTION

In the following detailed description, reference is made to the accompanying drawings which form a part hereof wherein like numerals designate like parts throughout, and in which is shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments of the present disclosure; however, the order of description should not be construed to imply that these operations are order dependent or need to be discrete operations.

The description may use the phrases "in an embodiment," or "in embodiments," which may each refer to one or more of the same or different embodiments. The phrase "in various embodiments" is used repeatedly. The phrase generally does not refer to the same embodiments; however, it may. The terms "comprising," "having," and "including" are synonymous, unless the context dictates otherwise.

The terms chip, die, integrated circuit, monolithic device, semiconductor device, and microelectronic device are often used interchangeably in the microelectronics field. The present invention is applicable to all of the above as they are generally understood in the field.

Figure 1:
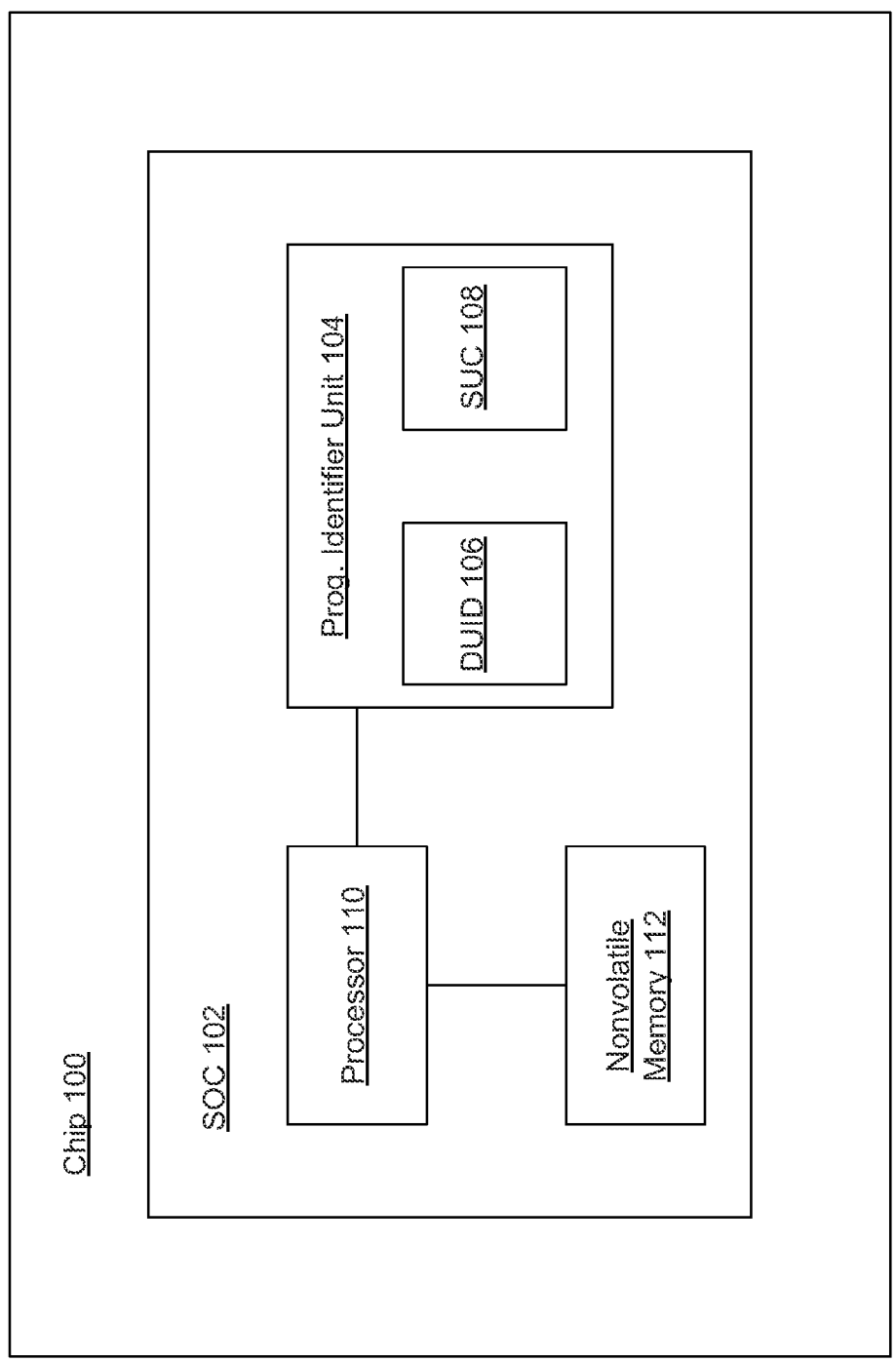
FIG. 1 schematically illustrates an example of a chip, in accordance with an embodiment of the present disclosure.

FIG. 1 schematically illustrates an example of a chip 100 that has been configured to include at least one electrical circuit such as, for example, a System-on-a-Chip (SoC) 102. The SoC 102 includes a programmable identifier unit 104. In an embodiment, the programmable identifier unit 104 is configured to include at least two storage areas 106, 108 for storing at least two identifiers. The first identifier area 106 is for a Device Unit Identifier (DUID) that serves as an electrical circuit identifier and that is associated with the SoC 102. The first identifier area 106 is therefore referred to herein as the DUID area 106. The second identifier area 108 is for a system unit code (SUC) that is an encrypted identifier that is based on the DUID. The second identifier area 108 is therefore referred to herein as the SUC area 108. The programmable identifier unit 104 may be a single unit (as illustrated) or may comprise multiple units. In an embodiment where the programmable identifier unit 104 comprises multiple units, the first identifier area 106 and the second identifier area 108 may be located in a single unit of the programmable identifier unit 104 or may be located in different units of the programmable identifier unit 104.

In an embodiment, the DUID is readily decodable while the SUC is encrypted, and both the DUID and SUC can be used together to verify that SoC 102 is a genuine SoC. The SoC 102 is also configured with a processor or processing core 110 and an optional nonvolatile memory 112, which may be in the form of Read-Only Memory (ROM). Although nonvolatile memory 112 is seen as a block within SoC 102, in various embodiments, the nonvolatile memory 112 is external to the SoC 102. It is noted that the chip 100 and/or SoC 102 may include more components, such as, for example, more processors or processing cores, more memory, both volatile and nonvolatile, etc., depending upon the application.

In accordance with an embodiment, SoCs 102 are manufactured on chips 100. Each SoC 102 is labeled, for example to assist in correlating between test results and a specific SOC and for other quality assurance purposes. Prior to testing, the programmable identifier unit 104, typically a Read Only Memory, is programmed, i.e., "burned," with the DUID value in DUID area 106.

In accordance with various embodiments, the DUID is a unique number that is generated with any well known serial number generating algorithm, for example to indicate production information such as, for example, a batch, a wafer, and/or a location of the SoC 102 on the wafer and/or a location on chip 100. Thus, each SoC 102 includes its own unique DUID value, which is burned into a suitable memory, and which in accordance with an embodiment, can be readily readable from the suitable memory, and can be easily interpreted. It is additionally noted that in some embodiments, each DUID may also include an indicator corresponding to the vendor of the chip 100.

Once the chip 100 is complete and ready for installation on an electronic hardware device, the chip 100 is provided to an electronic hardware device manufacturer. The electronic hardware device manufacturer operatively installs the chip on an electronic device.

Figure 2:
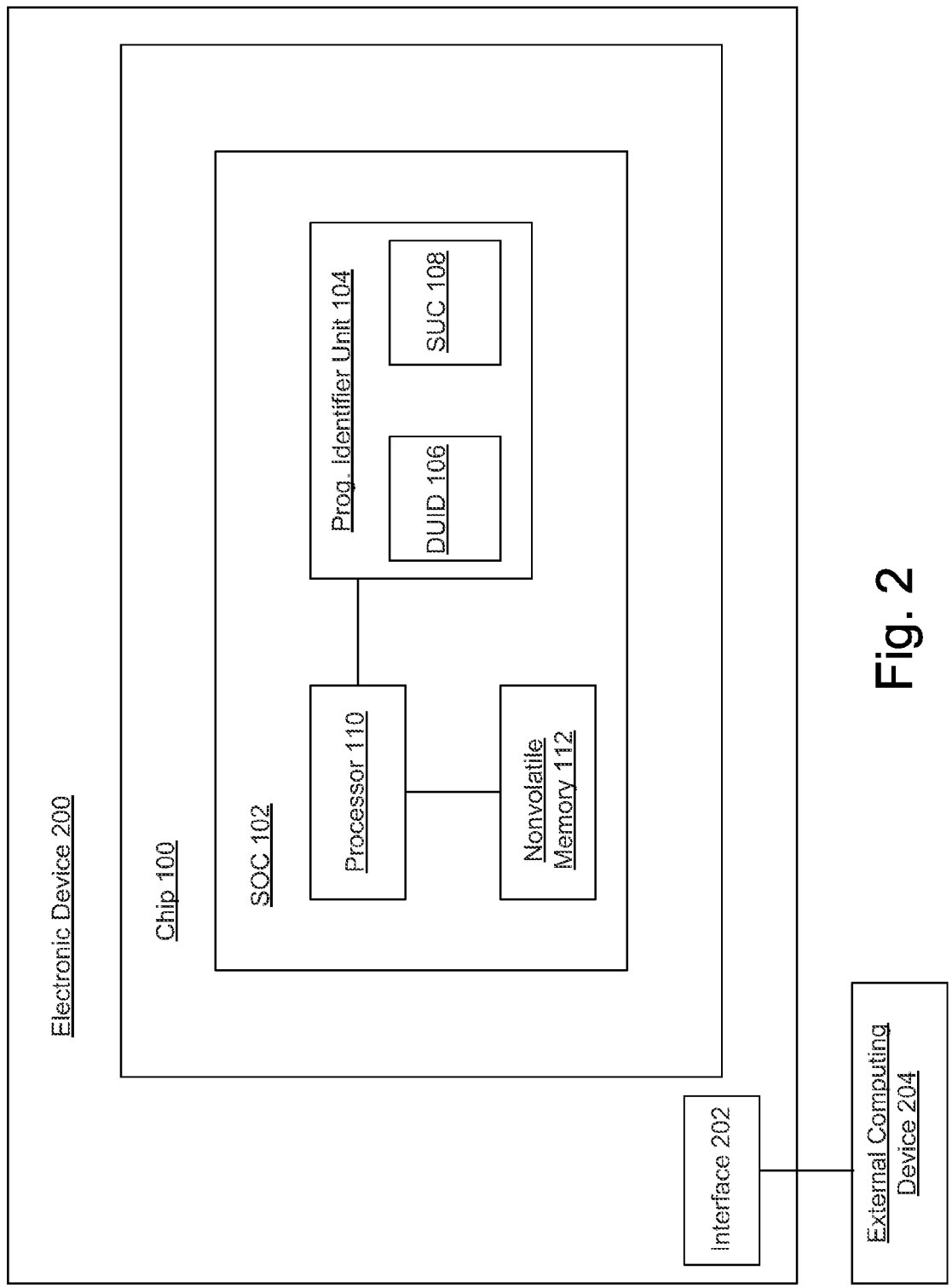
FIG. 2 schematically illustrates an example of an electronic device that includes the chip of FIG. 1, in accordance with an embodiment of the present disclosure.

FIG. 2 schematically illustrates an example of an electronic device 200 that includes a chip 100. The electronic device 200 typically includes an interface 202 (e.g., a Universal Serial Bus (USB) connection, Ethernet connection, IEEE 802.11 compliant wireless network connection, etc.) that can be operatively coupled to an external computing device 204 during testing and/or configuration of the electronic device 200 once manufacture of the electronic device 200 is complete. It is noted that the electronic device 200 may include more components than seen in FIG. 2, depending upon the type of electronic device 200 and desired functionality.

Upon completion of manufacture of the electronic device 200, the electronic device manufacturer generally performs various testing and/or configuration operations, such as, for example, functional testing and loading of various software and firmware, including input/output systems, device drivers and the like. During testing and/or configuration, the electronic device 200 is operatively coupled to the external computing device 204 via the interface 202 for operating the tests, receiving test results for the electronic device 200, and/or configuration of the electronic device 200.

In accordance with an embodiment of the present disclosure, upon initial start-up of the electronic device 200, system code stored within the nonvolatile memory 112 of the SoC 102 causes the processor 110 to read the programmable identifier unit 104. Alternatively, firmware within the SoC 102 causes the processor 110 to read the programmable identifier unit 104. When the processor 110 determines that the SUC identifier area 108 of the programmable identifier unit 104 does not include an SUC value, then electronic device 200 links to the external computing device 204, for example through interface 202. In an embodiment, processor 110 provides the DUID of the SoC 102 to the external computing device 204. The external computing device 204 then generates for the electronic device 200 a unique identifier that is based on the DUID. In accordance with an embodiment, the unique identifier is the SUC value and is made up of the DUID value and an additional encryption block, which in accordance with an embodiment of the disclosure is encrypted. Moreover, in accordance with an embodiment, the unique identifier may additionally include a vendor identifier, although this may or may not be necessary.

In an embodiment, the SUC value is encrypted and is specific for a given DUID. The SUC and the DUID together define a value that is decodable using a suitable decoding algorithm, which may be incorporated into, for example, firmware on the SOC, operating system software, device drivers, various software applications or elsewhere. In an embodiment, although the DUID can be readily interpreted, and the SUC is encrypted, together both form a device specific identifier. In an embodiment, this device specific identifier provides a correct decoding result that is indicative of a specific SOC having received the SUC from the external computer only when the device specific identifier is defined by the DUID for the device along with the SUC received from the external computing device 204. Any changes either to the DUID or to the SUC will produce a decoded result that indicates that either the DUID or the SUC was changed, which in turn is indicative, for example, that a SUC received from the external computing device 204 is being used with an electronic device 200 other than the device for which it was intended. Because the SUC is encrypted, DUIDs and SUCs can not be readily incremented to generate correct decoding results.

In accordance with an embodiment, the SUC value received from the external computing device 204 is programmed or "burnt" into the SUC identifier area 108 of the programmable identifier unit 104 when received from the external computing device 204. In accordance with various embodiments, the SUC value is generated using a private key of an asymmetrical encryption algorithm, for example, Rivest Shamir and Adleman (RSA) Algorithm or Elliptic Curve Digital Signature Algorithm (ECDSA). Accordingly, the SUC& DUID values serves to specifically identify the electronic device 200. The SUC value can thus be used as an authorization for that specific electronic device 200 to access and/or perform various functions and/or features of the electronic device 200 and/or the chip 100. These various functions and features may be provided by the electronic device 200's manufacturer and/or the chip 100's manufacturer. The various functions may also be vendor specific, i.e., a vendor of the electronic device 200. A customer that ultimately obtains the specific electronic device 200 may thus only use the electronic device 200 and/or the chip 100 in accordance with the authorization provided by the SUC.

For example, upon subsequent start-up of the electronic device 200, the system code stored within the SoC 102 is utilized by the processor 110 to check the SUC area 108 of the programmable identifier unit 104. The processor 110 realizes that the SUC identifier area 108 of the programmable identifier unit 104 includes an SUC value. The processor 110 uses a public key of asymmetrical encryption algorithm to decode the SUC value, in conjunction with the DUID value, to thereby identify the particular electronic device 200 via the SUC value. Thus, since the DUID and the SUC together both form a device specific identifier, based upon this identification, the electronic device 200 may only access and/or perform various functions and/or features of the electronic device 200 and/or the chip 100 that are authorized by the identification of the SUC.

As another example, in an embodiment, the nonvolatile memory 112 includes two or more sets of binary code for execution by the processor 110. Upon subsequent start-up of the electronic device 200, the system code stored within the SoC 102 is utilized by the processor 110 to check the SUC area 108 of the programmable identifier unit 104. The processor 110 determines that the SUC identifier area 108 of the programmable identifier unit 104 includes an SUC value. The processor 110 uses a public key of an asymmetrical encryption algorithm to check the SUC value, in conjunction with the DUID value, to thereby identify the appropriate set of code, for example, binary code, included within the nonvolatile memory 112 that may be utilized by the electronic device 200 based upon identifying the electronic device 200 via the SUC value.

Thus, for example, manufacturer A manufactures chips 100 for electronic device manufacturers B and C. Manufacturer A stores proprietary binary code for manufacturer B and proprietary binary code for manufacturer C in the appropriate nonvolatile memory 112 of each chip 100. Each SoC 102 on each chip 100 has its own unique DUID value programmed within its corresponding DUID area 106 of its programmable identifier unit 104. After installation of chips 100 on electronic devices 200 of manufacturers B and C, each SoC 102 has its own unique SUC value programmed within its corresponding SUC area 106 of its programmable identifier unit 104. The SUC value is generated according to the DUID with a private key of an asymmetrical encryption algorithm. The SUC value is associated with and identifies the electronic device manufacturer on whose electronic device 200 the corresponding chip 100 has been installed. During use of an electronic device 200 from manufacturer B, a public key generation algorithm decrypts and checks for the correct SUC value, in conjunction with the DUID value, of one or more SoCs 102 on corresponding chip 100 installed on the particular electronic device 200 being used. This identifies this particular electronic device 200 as being from manufacturer B. Proprietary binary code of manufacturer B that is included within the ROM 112 of the SoC 102 of the corresponding chip 100 may be utilized by this particular electronic device 200 and its corresponding chip 100. However, proprietary binary code of manufacturer C that is included within the ROM 112 of one or more SoCs 102 of the corresponding chip 100 may not be utilized by this particular electronic device 200 and its corresponding chip 100.

Thus, the proprietary binary code of the manufacturer of the electronic device 200 is the only proprietary binary code that may be operated on the electronic device 200. Each ROM 112 may also include proprietary binary code from the chip manufacturer that may be restricted to use by only electronic devices from certain hardware vendors. Such restricted use may be controlled in a manner as described herein.

Figure 3:
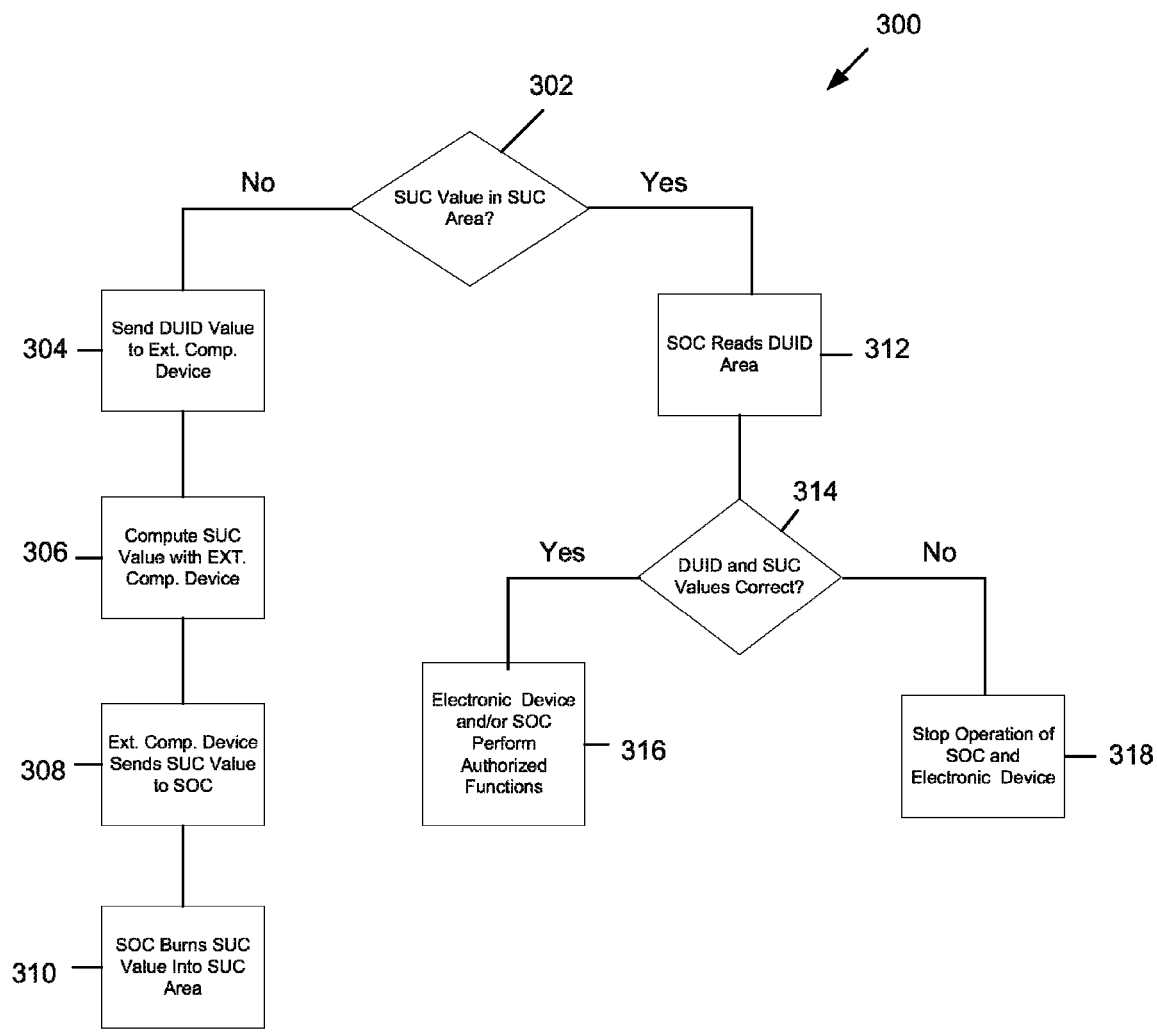
FIG. 3 illustrates a method for protecting against unauthorized use of electronic hardware devices, in accordance with an embodiment of the present disclosure.

Referring to FIG. 3, a method 300 in accordance with various embodiments of the present disclosure is schematically illustrated. At 302, an SoC reads a programmable identifier unit SUC area within the SoC to see if the SUC area is burned with an SUC value. If it is not, at 304 the SoC sends the DUID value located with the DUID area of the programmable identifier unit to an external computing device. At 306, the external computing device then computes an SUC value according to a private asymmetrical encryption algorithm. At 308, the external computing device provides the SUC value back to the SoC. At 310, the SOC burns the SUC value into the SUC area of the programmable identifier unit.

If the SoC reads the SUC area of the programmable identifier block and the SUC value is burned into the SUC area, at 312 the SoC reads the DUID area of the programmable identifier unit. At 314, the SoC confirms the values of the DUID and SUC according to a public signature verification algorithm. If the SUC and DUID values are correct, then at 316 the electronic device and/or SoC perform authorized functions. If not, then at 318 operation of the electronic device and the SoC is stopped.

Although specific embodiments have been illustrated and described herein, a wide variety of alternate and/or equivalent implementations may be substituted for the specific embodiment shown and described without departing from the scope of the present disclosure. This disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware. This application is intended to cover any adaptations or variations of the embodiment discussed herein. Therefore, it is manifested and intended that the disclosure be limited only by the claims and the equivalents thereof.

What is claimed is:

1. A method comprising:
receiving, by a manufacturer of an electronic device from a manufacturer of a chip, the chip including an electrical circuit, an electrical circuit identifier for the electrical circuit being previously stored by the manufacturer of the chip in a programmable identifier unit of the electrical circuit, the electrical circuit identifier for the electrical circuit acting as a unique identifier for the electrical circuit, the electrical circuit identifier previously stored by the manufacturer of the chip in the programmable identifier unit of the electrical circuit being un-encrypted;

acquiring, by a computing device that is located external to the electrical circuit and that is controlled by the manufacturer of the electronic device, the electrical circuit identifier for the electrical circuit from the programmable identifier unit of the electrical circuit;

generating, by the computing device that is located external to the electrical circuit and that is controlled by the manufacturer of the electronic device, an encrypted identifier that is unique for the electronic device that includes the electrical circuit, wherein the encrypted identifier is generated by encrypting, using a private key of an asymmetrical encryption algorithm, the electrical circuit identifier being acquired from the programmable identifier unit of the electrical circuit; and storing, by the manufacturer of the electronic device, the encrypted identifier in the programmable identifier unit, to enable (i) verifying, by the SoC, that the encrypted identifier is genuine, and (ii) operating, by the SoC, software stored within the SoC.

2. The method of claim 1, wherein the generating comprises generating the encrypted identifier that, when decoded, provides an indication of whether the encrypted identifier is a genuine encrypted identifier.

3. The method of claim 1, wherein the acquiring comprises acquiring an identifier for a system-on-a-chip (SoC).

4. The method of claim 1, wherein the generating comprises generating the encrypted identifier with (i) an encryption block provided by the manufacturer of the electronic device and (ii) the electric circuit identifier.

5. The method of claim 4, wherein the generating comprises generating the encrypted identifier with (i) the encryption block and (ii) the electric circuit identifier with the asymmetrical encryption algorithm.

6. The method of claim 4, wherein the generating comprises generating the encrypted identifier with (i) the encryption block and (ii) the electric circuit identifier with one of Rivest, Shamir and Adleman (RSA) algorithm or Elliptic Curve Digital Signature Algorithm (ECDSA).

7. An apparatus comprising:
an electrical circuit, the electrical circuit comprising:
a programmable identifier unit including an electrical circuit identifier, the electrical circuit identifier being previously stored by a manufacturer of a chip in the programmable identifier unit of the electrical circuit, the electrical circuit identifier previously stored by the manufacturer of the chip in the programmable identifier unit of the electrical circuit being un-encrypted, the chip comprising the electrical circuit, the electrical circuit identifier for the electrical circuit acting as a unique identifier for the electrical circuit;
storage that stores system code; and
a processor;
wherein the system code is configured to
cause the processor upon start up of the apparatus to determine whether a genuine encrypted identifier was previously generated for an electronic device that includes the apparatus,
if no genuine encrypted identifier was previously generated for the electronic device, cause the processor to read the programmable identifier to determine the electrical circuit identifier,
communicate with an external computing device that is located external to the electrical circuit, the external computing device being controlled by a manufacturer of the apparatus, the manufacturer of the apparatus receiving the electrical circuit from the manufacturer of the chip,
receive an encrypted identifier that is unique for the electronic device, wherein the encrypted identifier is generated by the external computing device by encrypting, using a private key of an asymmetrical encryption algorithm, the electrical circuit identifier being read from the programmable identifier unit of the electrical circuit, and
store the encrypted identifier in the programmable identifier unit,
verify that the encrypted identifier stored in the programmable identifier unit is a genuine encrypted identifier, and
based on verifying that the encrypted identifier stored in the programmable identifier unit is genuine, enable further operations of the processor.

8. The apparatus of claim 7, wherein the electrical circuit is a system-on-a-chip (SoC) and the electrical circuit identifier is an SoC identifier that indicates production information relating to the SoC.

9. The apparatus of claim 7, wherein the programmable identifier unit is a single unit.

10. The apparatus of claim 7, wherein the programmable identifier unit comprises multiple units.

11. The apparatus of claim 10, wherein the electrical circuit identifier and the encrypted identifier are stored in a single unit.

12. The apparatus of claim 10, wherein the electrical circuit identifier and the encrypted identifier are stored in different units.

13. An electronic device comprising a chip that comprises a system-on-chip (SoC), the SoC comprising:
a programmable identifier unit including an SoC identifier, the SoC identifier being previously stored by a manufacturer of the chip in the programmable identifier unit of the SoC, the SoC identifier previously stored by the manufacturer of the chip in the programmable identifier unit of the SoC being un-encrypted, the SoC identifier acting as a unique identifier for the SoC;
storage that stores system code; and
a processor;
wherein the system code is configured to
cause the processor upon start up of the SoC to determine whether a genuine encrypted identifier was previously generated for the electronic device,
if no genuine encrypted identifier was previously generated for the electronic device, cause the processor to read the programmable identifier to determine the SoC identifier,
communicate with an external computing device located external to the SoC, the external computing device being controlled by a manufacturer of the electronic device, the manufacturer of the electronic device receiving the chip from the manufacturer of the chip,
receive an encrypted identifier that is (i) unique for the electronic device and (ii) is generated by the external computing device by encrypting, using a private key of an asymmetrical encryption algorithm, the SoC identifier being read from the programmable identifier unit of the SoC, and
store the encrypted identifier in the programmable identifier unit,
verify that the encrypted identifier is a genuine encrypted identifier, and based upon verifying that the encrypted identifier is genuine, enable a further operation of the processor.

14. The electronic device of claim 13, wherein the programmable identifier unit is a single unit.

15. The electronic device of claim 13, wherein the programmable identifier unit comprises multiple units.

16. The electronic device of claim 15, wherein the SoC identifier and the encrypted identifier are stored in a single unit.

17. The electronic device of claim 16, wherein the SoC identifier and the encrypted identifier are stored in different units.

* * * * *